May 8, 1956   J. R. ADAMS   2,744,353
MULTIPLE RECEPTACLE FOR FISHING TACKLE
Filed Dec. 6, 1952

INVENTOR
JAMES R. ADAMS
BY *Henry Molz*
ATTORNEY

United States Patent Office 2,744,353
Patented May 8, 1956

2,744,353

MULTIPLE RECEPTACLE FOR FISHING TACKLE

James R. Adams, Los Angeles, Calif.

Application December 6, 1952, Serial No. 324,544

2 Claims. (Cl. 43—54.5)

The primary purpose of my invention is the provision of a uniquely designed and compact multiple container for holding the varying fishing tackle requirements such as hooks, flies, leaders, sinkers and accessory items wherein such articles readily may be placed, and from which each may as readily be removed without disturbing such items as are not withdrawn.

An important objective of the device embodying my invention is to provide a container whereby such hooks, flies and accessories may be as readily placed therein attached to leaders, and when so attached, the leaders together with the attached hook, fly or other accessory may be released therefrom for instantaneous use, free from snarls and entanglements;

A further object of the device is to provide a means wherein leaders are retained in a pliable condition to assure the foregoing objective;

A still further objective is the provision of a device that may readily be carried about in the fiisherman's pockets, or otherwise as desired;

And a still further objective is the provision of a receptacle unit that can be produced to embrace a multiplicity of the containers or receptacles whereby the usual and common tackle box may be entirely eliminated.

Other objects and specific advantages of the invention will the more fully appear from the following description and accompanying drawings, in which.

Similar numerals of reference indicate like parts throughout the several views.

As shown in the accompanying drawings, a multiple receptacle embodying the invention includes a main unit consisting of a spool 1, and a cup-like receptacle 2. The spool 1 is adapted to have fishing leaders designated L, snelled hooks or line, wound thereon and is hollow whereby sinkers or other small items of fishing tackle may be carried therein. Accordingly, the spool consists of a cylindrical body 1a open at one end and provided with a circular plunger 1b closing the other end and which serves serves as a closure for the receptacle.

Figure 4:
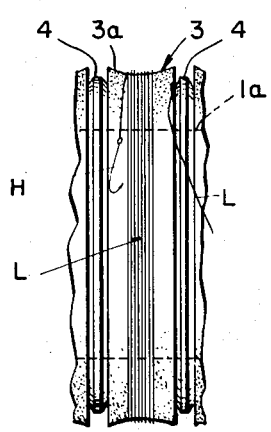
Figure 4 is a fragmentary side elevation of the spool unit showing the manner of winding and securing a leader thereon, with a hook attached to the leader.

In order that a plurality of leaders or the like may be individually wound on the spool subject to separate removal without disturbing the leaders remaining thereon, a plurality of rings 3 and annular disks 4 are mounted on the spool. Each ring is made of sponge rubber or like material so as to have a concaved periphery 3a of sufficient width to wind a foot or more of leader or line thereon. When a hook H is attached to a leader it may be safely hooked into one of the rings 3 as shown in Figure 4.

The disks 4 are made of hard material and are disposed between the rings 3, being of smaller diameter than the rings so as not to interfere with winding and removal of the leaders. The ends of the leaders may be secured by wedging them between the rings 3 and the disks 4 as shown in Figure 4, leaving small end portions projecting from the peripheries of the rings so that the leaders may be grasped for removal as needed.

The receptacle 2 consists of a bottom wall 2a, a cylindrical wall 2b and a central tubular hub member 2c of cylindrical form. The hub member 2c is formed integrally with the bottom wall 2a, being equal in length to that of the wall 2b but of such smaller diameter as to provide a large annular receptacle space between it and the wall 2b. Sinkers and other items of fishing tackle may be carried in this space.

The bottom wall 2a is provided with a central opening 2d of the same diameter as the bore of the hub member 2c for the purpose hereinafter described.

The body 1a of the spool 1 is adapted to be telescopically mounted on the hub member 2c of the receptacle 2, subject to free rotation thereon. When the spool is pushed home on the hub member 2c, the flange 1b serves as a closure for the open end of the receptacle 2.

Upon pulling the spool 1 outwardly on the hub member 2c while permitting a portion of the body 1a to remain in telescoped relation to the hub portion, the leaders or other members wound on the spool may be removed by releasing the ends thereof from wedged relation with the spool and pulling thereon. The spool will rotate freely on the hub portion 2c thereby making possible an easy selective unwinding and removal of the leaders as shown for example in Figure 4.

Figure 1:
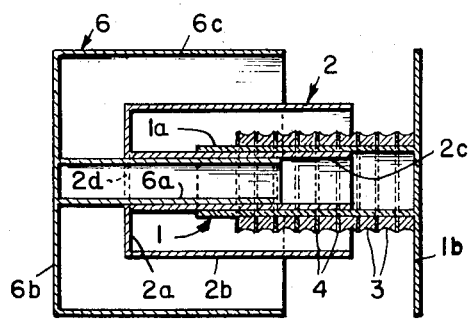
Figure 1 is a longitudinal sectional view of a device embodying the invention.
Figure 2:
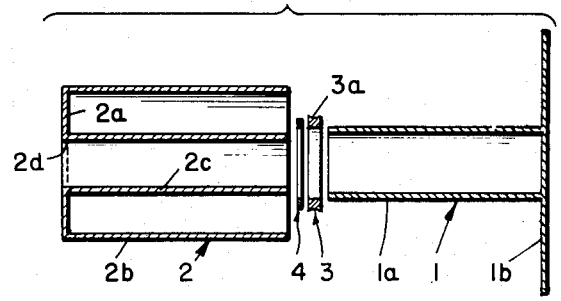
Figure 2 is an exploded sectional view of the center units of the device shown in Figure 1.
Figure 3:
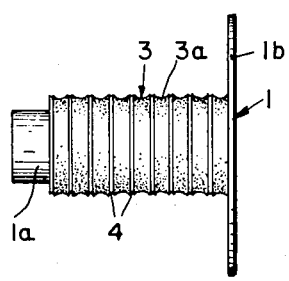
Figure 3 is a side elevation on the scale shown in Figure 2, of the spool unit shown in Figures 1 and 2.
Figure 6:
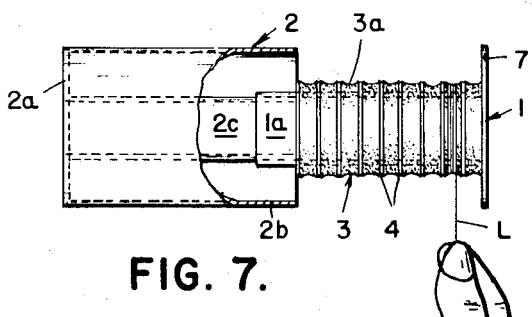
Figure 6 is a sectional view partly in side elevation showing the manner of taking a leader off the spool of all forms of the invention.
Figure 7:
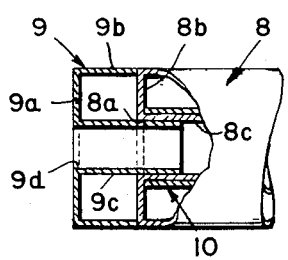
Figure 7 is a fragmentary sectional view partly in elevation of a further modification of the invention.

The main unit as herebefore described, is adapted to be combined with one or more additional receptacles as shown in Figures 1 and 7. However, it may be used apart from additional receptacles in which case it takes the form shown in Figures 5 and 6. In the latter case it is of the same construction as shown in Figures 1 and 2 except that the flange for the tool is dimensioned to close the receptacle in which the spool is mounted.

Figure 5:
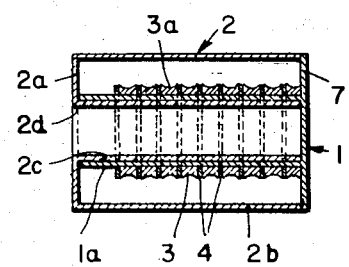
Figure 5 is a longitudinal sectional view of a modified form of the invention.

As shown in Figure 1, a cup-like outer receptacle 6 is adapted to fit over the main unit receptacle 2, being of substantially the same construction as the receptacle 2 but of greater diameter. Thus the cylindrical hub portion 6a integral with the imperforate bottom wall 6b of the receptacle 6 is adapted to be slidably inserted through the opening 2d into the bore of the hub member 2c of the receptacle 2. The receptacle 6 is dimensioned so that an annular receptacle space will be provided between the cylindrical wall 6c and 2b when the receptacle 6 is fitted onto the receptacle 2. In this connection it should be noted that the flange 1b on the spool 1 is dimensioned to serve as a closure for the receptacle 6 as well as for the receptacle 2. The exception is where the main unit is used independently of additional receptacles as shown in Figures 5 and 6, in which case the flange is of such diameter as to close the one receptacle only. Accordingly the same reference characters are applied to Figures 5 and 6 as to Figures 1—4, with the exception of the numeral 7 applied to the smaller flange shown in Figures 5 and 6.

Another modified form of the invention is shown in Figure 7. It comprises a main unit 8 corresponding to the main unit shown in Figures 5 and 6 in which is applied a small receptacle 9 similar to additional receptacle 6. This smaller receptacle comprises a bottom wall 9a, a cylindrical wall 9b and a center cylindrical hub member 9c integral with the bottom wall 9a. This hub member is of greater length than the wall 9b and extends outwardly therefrom sufficiently to permit of insertion through the opening 8a in the bottom 8b of the unit 8 and into the hub portion 8c of the unit 8. This arrangement provides for removably holding the receptacle 9 on the unit 8 with the bottom wall 8b closing the receptacle 9. Numerous articles of fishing tackle may be carried in the receptacle 9 subject to ready removal upon detaching of the receptacle from the unit 8. The bottom wall 9a of the receptacle 9 is provided with an opening 9d registering with the bore of the hub member 9c. If desired a suitable closure such as a plug not shown may be applied to the opening 9d whereby the hub 9c may be used in conjunction with the hub 8c for storage of small items of fishing tackle. Moreover the opening 9d makes it possible to apply another receptacle not shown and corresponding to the receptacle 6 in Figure 1, the receptacle 9 and the unit 8 in the same manner as shown in Figure 1. A spool 10 identical with the spool 1 is mounted in the unit 8.

It will now be seen that the present invention provides a multiple receptacle assembly of simple and inexpensive construction and of small compass as a most convenient storage means for fishing leaders, hooks, flies, sinkers and other miscellaneous fishing items, tackle and accessories of varying kinds and as useful to the fresh and salt water fisherman alike, and having ready access to said items coupled with the selective removal thereof.

It should also be noted that the sponge rubber or similar component rings 3 on which the leaders are wound, may be moistened and will retain water or other suitable liquid substance whereby the leaders proper will be maintained in a soft and pliable condition and thus prevented from becoming coiled, snarled, kinked or otherwise irregular set due to being curled in being wound upon the spool. This thus constitutes an important feature of the invention.

The construction of the main unit consisting of the receptacle and the spool mounted therein makes it possible readily to add receptacles in the manner shown in Figures 1 and 7 to increase the carrying capacity of the device and without greatly increasing its bulk. Thus the device produced in accordance with this invention may be conveniently carried in a garment pocket of the fisherman, or otherwise as desired, yet afford considerable storage capacity in consideration of its small size.

While the receptacles as here shown are cylindrical, it is apparent that they could as readily be square, rectangular or otherwise provided the hub portion for mounting the spool be cylindrical so as to permit of free rotation of the spool in the manner here shown.

The device provides a uniquely designed contrivance for its purpose. It is extremely light in weight, durable, readily produced from materials the open market affords to make it so, and at a very reasonable cost.

I am aware that slight modifications in structure may from time to time readily suggest themselves without departing, however, from the scope of the invention herein disclosed. Hence, I do not limit my present invention to the exact arrangement and description herein set forth, but what I do claim is:

1. A receptacle unit for the retention of fishing tackle items such as leaders, hooks, sinkers, flies and similar accessories, comprising a receptacle having a bottom wall, a continuous side wall, and an open end; a hub member supported by said bottom wall within the receptacle in spaced relation to said side wall; a spool having a hollow body adapted to be rotatably and slidably telescoped on said hub member; said receptacle providing an annular space for the reception of said items between said side wall and said hollow body when the latter is mounted on said hub member; said hollow body being adapted to have leaders and the like wound thereon; said hub member being hollow; said bottom wall having an opening therein registering with the bore of said hollow member; a second receptacle having a bottom wall, a continuous side wall and an open end; a hub member supported by the bottom wall of said second receptacle; said last named hub member being slidably extended through said opening into the bore of said first mentioned hub member; said continuous side walls providing an annular space therebetween for reception of such items, and a flange on said hollow body member for closing the open ends of said receptacles.

2. A receptacle unit for the retention of fishing tackle items such as leaders, hooks, sinkers, flies and similar accessories, comprising a receptacle having a bottom wall, a continuous side wall, and an open end; a hub member supported by said bottom wall within the receptacle in spaced relation to said side wall; a spool having a hollow body adapted to be rotatably and slidably telescoped on said hub member; said receptacle providing an annular space for the reception of said items between said side wall and said hollow body when the latter is mounted on said hub member; said hollow body being adapted to have leaders and the like mounted thereon; said hub member being hollow; said bottom wall having an opening registering with the bore of said hub member; a second receptacle having a bottom wall, a continuous side wall and a hub member; said last named member being slidably extended through said opening into the bore of the first mentioned hub member, said second receptacle providing an annular space for reception of articles between the continuous wall and the hub member thereof, and means on said spool serving as a closure for both of said receptacles.

References Cited in the file of this patent

UNITED STATES PATENTS

| | | |
|---|---|---|
| 920,663 | Schaney | May 4, 1909 |
| 1,908,278 | Angell | May 9, 1933 |
| 2,082,546 | Machate et al. | June 1, 1937 |
| 2,517,866 | Glahn | Aug. 8, 1950 |
| 2,553,097 | Lampe | May 15, 1951 |
| 2,586,170 | Lawrenz | Feb. 19, 1952 |
| 2,596,896 | Goad | May 13, 1952 |
| 2,670,564 | Keener | Mar. 2, 1954 |